United States Patent Office 3,518,307
Patented June 30, 1970

3,518,307
CYCLOHEXENYL AMINES
William Taub, Zurich, Rolf Denss, Basel, and Franz Ostermayer, Riehen, Switzerland, assignors to Geigy Chemical Corporation, Ardsley, N.Y., a corporation of New York
No Drawing. Filed Feb. 2, 1968, Ser. No. 702,552
Claims priority, application Switzerland, Feb. 6, 1967, 1,820/67
Int. Cl. C07c 87/34; A61k 27/00
U.S. Cl. 260—563                                    4 Claims

ABSTRACT OF THE DISCLOSURE

Alkyl and alkenyl substituted cyclohexenyl amines are prepared which compounds as well as pharmaceutically acceptable acid addition salts thereof have analgesic and anorexigenic activities; therapeutic compositions containing said compounds and methods of producing analgesic and anorexigenic effects in mammals; an illustrative embodiment is 1-methyl-3-cyclohexen-1-ylamine.

DETAILED DISCLOSURE

The present innvention concerns substituted cyclo hexenylamines as well as pharmaceutically acceptable acid addition salts thereof, therapeutic compositions containing such amines or acid addition salts thereof and methods for producing analgesic and anorexigenic effects in mammals.

More particular the present invention pertains to substituted cyclohexenylamines of Formula I

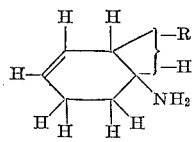

wherein R is lower alkyl and lower alkenyl; and pharmaceutically acceptable acid addition salts thereof.

These compounds and their addition salts with inorganic and organic acids, have valuable pharmacological properties, in particular analgesic and anorexigenic activities combined with a favourable therapeutic index. The new cycloaliphatic amines of Formula I and their pharmaceutically acceptable acid addition salts are suitable as analgesics which can be administered orally, rectally or parenterally for the amelioration and relief of pain of various origin. In addition, the new amines of Formula I can also be used for the suppression of appetite for which purpose they are administered as above, preferably orally.

In the new cycloaliphatic amines of general Formula I, R is, e.g., the methyl, ethyl, n-propyl, isopropyl, n-butyl, isobutyl, sec. butyl, n-pentyl, isopentyl, neopentyl, n-hexyl, allyl, 1-methylallyl, 2-methylallyl, crotyl, 3-butenyl or 3-methylcrotyl group.

The cycloaliphatic amines of Formula I are produced according to the method of Hofmann, Curtius or Lossen by degradation of a reactive functional derivative of a carboxylic acid of Formula II.

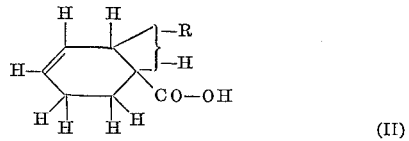
(II)

wherein R has the meaning given above, or by degradation of this acid itself. As reactive functional derivatives, the amide is used for the Hofmann degradation, the azide for that according to Curtius and the free acid, hydroxamic acid or salts and O-acyl derivatives thereof are used for the Lossen degration.

The amides of carboxylic acids of Formula II are degraded according to Hofmann to form amines of Formula I by reacting the amides with a substance or a mixture of substances giving off chlorine or bromine and alkali metal or alkaline earth metal ions in water or in a lower alkanol such as methanol or ethanol. For example, the amide is added to the alkaline/aqueous solution of an alkali hypohalogenite, e.g., sodium hypochlorite or hypobromite, and the reaction mixture is heated to about 70–90°. In a variation of the Hofmann degradation, bromine is reacted with the amide of a carboxylic acid of Formula II in a lower alkanol in the presence of the corresponding sodium alkanolate, the reaction being performed at a moderately raised temperature to the boiling temperature of the alkanol used, and the N-(alkylcyclohexenyl)—or N - (alkenylcyclohexenyl)—carbamic acid alkyl esters formed are hydrolysed in conventional manner, e.g. by heating with sodium, potassium, calcium or barium hydroxide in water or a lower alkanol. The hydrolysis of the carbamic acid alkyl esters can also be performed in an acid medium, e.g. in concentrated hydrochloric acid or in alkanolic, e.g. ethanolic, hydrochloric acid.

Some of the amides of acids of Formula II required as starting materials are known and others can be produced from known nitriles or lower alkyl esters of the acids in usual ways, e.g. by partial hydrolysis of the nitriles, or by aminolysis of the esters with ammonia at raised temperatures in a closed vessel, or by hydrolysis of the esters to the free acids, conversion of the latter into acid chlorides and reaction of the latter with ammonia. Hitherto unknown nitriles ad low alkyl esters of acids of Formula II can be produced analogously to the known ones.

The Curtius degradation of the azides can be performed, e.g. in water in the presence of an inorganic or organic acid, e.g. hydrochloric acid, acetic acid or trifluoroacetic acid, preferably by gradually heating the reaction mixture to its boiling temperature and refluxing until gas development has ceased.

The Curtius degradation can also be performed in steps by first reacting the azides of an acid of Formula II in the presence or absence of an inert organic solvent such as toluene or xylene, with a hydroxyl compound which, in excess, can serve as reaction medium, e.g. with a lower alkanol such as methanol, ethanol or tert. butanol, or a cycloalkanol or aryl alkanol such as cyclohexanol or benzyl alcohol, the reaction being performed while heating, e.g at the boiling temperature of the reaction mixture to form the corresponding N-(alkylcyclohexenyl)—or N-(alkenylcyclohexenyl)—carbamic acid esters. The carbamic acid ester obtained is then hydrolysed as described in the Hofmann degradation. In another degradation in steps the azide of an acid of Formula II is reacted with an anhydrous acid, e. g. with trifluoroacetic acid, or with a mixture of acetic acid and acetanhydride, and the N-acyl derivative of an amine of Formula I so obtained is hydrolysed. An N-trifluoroacetyl derivative is hydrolysed, e.g. with water, an N-acetyl derivative is hydrolysed, e.g. in the way given above for the carbamic acid esters. The Curtius degradation can also be performed by converting the azide of an acid of Formula II by thermal decomposition in an inert organic solvent, e.g. in an aromatic hydrocarbon such as benzene, toluene, xylenes or in a higher boiling ether or ether-type solvent such as diethylene glycol dimethyl ether or dioxane, into the corresponding (alkylcyclohexenyl)—or (alkenylcyclohexenyl) — isocyanate. The isocyanate is then converted, analogously to the method given above for the azide, into the corresponding amine of Formula I, or it is reacted with hydroxyl compounds or anhydrous acids to form an N-(alkylcylohexenyl)—or N-(alkenylcyclohexenyl)—carbamic acid ester or an N-acyl derivative of an amine of Formula I, respectively.

The azides of acids of Formula II are new compounds. They are obtained by reacting alkyl esters of acids of Formula II with hydrazine and further reacting the hydrazides formed with nitrous acid. They also are obtained in one step by reacting the alkyl esters simultaneously with hydrazine and nitrous acid, preferably in the presence of a solvent or diluent. The azides are also obtained, e.g. by converting the acids of Formula II into their acid chlorides and reacting the latter with alkali metal azides such as sodium azide.

In a variation of the Lossen method, acids of Formula II are transformed into amines of Formula I by heating the acids in a mineral acid such as polyphosphoric acid together with hydroxylamine hydrochloride or hydroxylamine sulphate.

In another variation of the Lossen degradation, the hydroxamic acid corresponding to an acid of Formula II is converted into a salt, e.g. the barium salt, and this is subjected to dry distillation in vacuo.

According to a third variation of the Lossen degradation, an O-acyl derivative, particularly an O-aroyl derivative such as the O-benzoyl derivative, of the hydroxamic acid corresponding to an acid of Formula II is reacted with an alkali metal alcoholate, e.g. with potassium methylate, in an inert solvent to form the corresponding alkali metal salt. On heating the latter in an inert solvent, e.g. a hydrocarbon such as benzene, this separates into the corresponding (alkylcyclohexenyl)—or (alkenylcyclohexenyl)—isocyanate and into the corresponding alkali metal salt, e.g. potassium benzoate. The isocyanate formed is then converted directly or in steps as given above into the corresponding amine of Formula I.

In a fourth variation of the Lossen method, an O-acyl derivative, e.g. the O-benzoyl or O-phenylsulfonyl derivative of the hydroxamic acid, is gradually added to a hot aqueous solution of an alkali metal hydroxide such as sodium hydroxide, whereby a mixture of an amine of Formula I and the corresponding N,N'-bis-(alkylcyclohexenyl)—or N,N' - bis - (alkenylcyclohexenyl)urea is formed by way of the isocyanate which is unstable in the reaction mixture. The desired amine can be obtained by hydrolysing the latter, e.g. by heating with ethanolic/ aqueous hydrochloric acid in a closed vessel.

The hydroxamic acids required for the second variation of the degradation process are produced, e.g. by reacting the chlorides of acids of Formula II with hydroxylamine hydrochloride in an inert solvent such as ether or benzene, in the presence of an acid binding agent, e.g. soduim carbonate. The O-aroyl and O-arylsulphonyl hydroxamic acids used in the third or fourth variation of the dergradation process, respectively, are obtained, e.g. by reacting the hydroxamic acids with aroyl chlorides or arylsulphonyl chlorides such as benzoyl chloride or benzene sulphonyl chloride, in the presence of a slight excess of acid binding agent such as potassium hydroxide or sodium carbonate, in water. O-acetyl hydroxamic acids are obtained analogously in an anhydrous medium.

Cycloaliphatic amines of Formula I are converted, if desired, into pharmaceutically acceptable acid addition salts. Such salts are prepared with acids such as hydrochloric acids, hydrobromic acid, sulfuric acid, phosphoric acid, methane sulfonic acid, ethane sulfonic acid, 2-hydroxyethane sulfonic acid, (alkylcyclohexenylamino)— or (alkenylcyclohexenylamino)—methane sulfonic acid derived from the corresponding amine of Formula I, acetic acid, lactic acid, succinic acid, fumaric acid, maleic acid, malic acid, tartaric acid, citric acid, ascorbic acid, benzoic acid, salicylic acid, phenylacetic acid, mandelic acid, embonic acid and 1,5-naphthalene disulfonic acid.

These and other addition salts are produced in the usual way. For example, the acid desired as salt component or a solution thereof is added to a solution of an amine of Formula I in water or in an organic solvent such as methanol, ethanol, isopropanol, acetone, butanone or diethyl ether, heated if desired, and the salt which precipitates immediately or after cooling, concentrating or adding a second organic liquid, e.g. diethyl ether, if an alkanol is used as solvent, is isolated.

The substituted cyclohexenylamines of Formula I as well as the acid addition salts thereof, as mentioned above, have now been found to exhibit valuable pharmacological properties, in particular analgesic and anorexigenic activity combined with a low order of toxicity. These favourable properties render the compounds of the invention well suited for the treatment, relief, and removal of pain of various origin and for the suppression of normal and excessive appetite.

The analgesic activity of a compound of the invention is illustratively demonstrated in mice in the writhing test according to E. Siegmund, R. Cadmus and G. Fu, Proc. Soc. Exp. Biol. Med. 95, 729 (1927). Thus it is shown that 1-methyl-3-cyclohexen - 1 - ylamine hydrochloric administered orally to white mice in amounts of between 25 and 50 mg./kg. of bodyweight has an excellent analgesic effect.

The analgesic activity of a compound of the invention is also demonstrated in white mice according to the method of Gross, Helv. Physiol. Pharmac. Acta 5, C31 (1947), with the apparatus according to Friebel and Reichle, Arch. exp. Path. u. Pharmakol. 226, 551 (1955). In this test 2-methyl-3-cyclohexen-1-ylamine hydrochloride administered orally in a dose of about 80 mg./kg. of bodyweight shows a very significant analgesic activity.

Anorexigenic effects of the compounds of the invention are determined according to the method of Spengler and Waser, Helv. Physiol. Pharmac. Acta 15, 444–449 (1957) in rats trained to consume food during daytime. Thus it is shown that 1-methyl-3-cyclohexen-1-ylamine hydrochloride on oral administration in an amount far below its toxic dose reduces food consumption to a significant extent.

The acute toxicity of the compounds of the invention as demonstrated in rats per os is of low order.

For their intended uses the compounds of the invention are administered orally, rectally or, particular in the form of aqueous solutions of the acid addition salts of the amines of Formula I, also parenterally, in amouts depending on the species, age and weight of the subject under treatment as well as on the particular condition to be treated and the mode of administration. Generally the daily doses of the compounds of the invention vary between 20 and 500 mg.

For administration purposes pharmaceutical compositions are prepared containing at least one amine of Formula I and/or at least one pharmaceutically acceptable acid addition salt thereof, an inert pharmaceutical carrier and, if desired, other additives. These compositions are presented for oral, rectal or parenteral administration in dosage units such as tablets, dragees (sugar coated tablets), capsules, suppositories or ampoules, preferably containing as active ingredient 5–100 mg. of a compound of the invention.

The amount of active ingredient in these dosage units is preferably 5% to 90%. To produce tablets or dragee cores, the active substances are combined, e.g. with solid pulverulent carriers such as lactose, saccarose, sorbitol, or mannitol; starches such as potato starch, maize starch or amylopectin; highly dispersed silicium dioxide; also laminaria powder or citrus pulp powder; cellulose derivatives or gelatine, if desired with the addition of lubricants such as magnesium or calcium stearate or polyethylene glycols.

Dragee cores are coated, e.g. with concentrated sugar solutions which can also contain, e.g. gum arabic, talcum and/or titanium dioxide, or with a lacquer dissolved in easily volatile organic solvents or mixture of solvents. Dyestuffs can be added to these coatings, e.g. to distinguish between varying dosages of active substance. Other dosage units suitable for oral administration are hard gelatine capsules and also soft closed capsules made of gelatine and a softener such as glycerin. The former preferably contain the active substance in the form of a granulate, optionally in admixture with diluents such as maize starch, with lubricants such as talcum or magnesium stearate and, optionally, stabilisers such as sodium metabisulphite ($Na_2S_2O_5$) or ascorbic acid. In soft capsules, the active substance is preferably dissolved or suspended in suitable liquids such as liquid polyethylene glycols to which stabilisers can also be added.

Examples of dosage units for rectal administration are suppositories which consist of a combination of a compound of Formula I or a suitable salt thereof with a suppository foundation, e.g. natural or synthetic triglycerides, or also gelatine rectal capsules which contain a combination of the active substance with polyethylene glycols.

Ampoules for parenteral, particularly intramuscular and also intravenous application preferably contain 10–200 mg. of a pharmaceutically acceptable, water soluble acid addition salt of a compound of Formula I. The concentration of the active substance is preferably between 0.5% and 10%; if necessary, suitable stabilisers and/or buffer substances are added to the ampoule solutions.

In addition, analgesic compositions according to the invention can be in forms not made up in single dosages such as ointments, tinctures and other solutions for local or percutaneous application. These are prepared with the usual ointment foundations or pharmaceutically acceptable solvents.

Two prescriptions are given below for the production of tablets and dragees:

(a) 500.0 g. of active substance, e.g. 1-methyl-3-cyclohexen-1-ylamine hydrochloride, 2-methyl-3-cyclohexen-1-ylamine hydrochloride or a salt of 1-methyl-3-cyclohexen-1-ylamine with (1-methyl-3-cyclohexen-1-ylamine)-methane sulfonic acid, are mixed with 550.0 g. of lactose and 292.0 g. of potato starch. The mixture is moistened with an alcoholic solution of 8.0 g. of gelatine and granulated through a sieve. After drying, 60.0 g. of potato starch, 60.0 g. of talcum, 10.0 g. of magnesium stearate and 20.0 g. of highly dispersed silicum dioxide are mixed in and the mixture is pressed into 10,000 tablets each weighing 150 mg. and containing 50 mg. of active substance. If desired the tablets can be grooved for better adaptation of the dosage.

(b) A granulate is prepared from 250.0 g. of active substance, e.g. 1-methyl-3-cyclohexen-1-ylamine hydrochloride, 2-methyl-3-cyclohexen-1-ylamine hydrochloride or the salt of 1-methyl-3-cyclohexen-1-ylamine with (1-methyl-3-cyclohexen-1-ylamino)-methane sulfonic acid, 175.90 g. of lactose and the alcoholic solution of 10 g. of stearic acid. After drying, the granulate is mixed with 56.60 g. of highly dispersed silicum dioxide, 165 g. of talcum, 20 g. of potato starch and 2.50 g. of magnesium stearate and the mixture is pressed into 10,000 dragee cores. These are then coated with a concentrated syrup made from 502.28 g. of crystallised saccharose, 6.0 g. of shellac, 10.0 g. of gum arabic, 0.22 g. of dyestuff and 1.5 g. of titanium dioxide and dried. The dragees obtained each weigh 120 mg. and contain 25 mg. of active substance.

The following examples further illustrate the production of the new cycloaliphatic amines and their acid addition salts without in any way limiting the scope of the invention. The temperatures are given in degrees centigrade.

EXAMPLE 1

1-n-propyl-3-cyclohexen-1-ylamine 15 litres of gaseous chlorine are introduced at 0–10° into a solution of 70 g. of sodium hydroxide in 1000 ml. of water, and 40 g. of 1-n-propyl-3-cyclohexene-1-carboxamide are added to the sodium hypochlorite solution obtained. The reaction mixture is gradually heated to 90° within 1½ hours while stirring and kept for 10 minutes at this temperature. 100 g. of sodium hydroxide are added by means of a sloping condenser whereupon the reaction mixture starts to reflux. The reaction mixture is cooled and extracted several times with ether. The combined ether solutions are extracted with 2 N hydrochloric acid. The combined hydrochloric acid solutions are concentrated and the crystalline residue is recrystallised twice from isopropanol, whereupon 1-n-propyl-3-cyclohexen-1-ylamine hydrochloride is obtained, M.P. 242–244° (with decomposition and sublimation). To liberate the base, the hydrochloride is dissolved in water, and treated with concentrated sodium hydroxide solution. The precipitated base is taken up in ether and the ether solution is evaporated. The base distils at 68–70° and 11 torr.

Analogously are obtained:
1-ethyl-3-cyclohexen-1-ylamine, B.P. 72–74°/13 torr, hydrochloride M.P. 255–258° (from isopropanol) from 1-ethyl-3-cyclohexene-1-carboxamide; and
1-n-butyl-3-cyclohexen-1-ylamine, B.P. 82–83°/11 torr, hydrochloride M.P. 213–216° (from isopropanol) from 1-n-butyl-3-cyclohexen-1-carboxamide.

EXAMPLE 2

1-isopentyl-3-cyclohexen-1-ylamine 71 g. of gaseous chlorine are introduced at 0–10° into a solution of 108 g. of sodium hydroxide in 1200 ml. of water. 72 g. of molten 1-isopentyl-3-cyclohexene-1-carboxamide are added, while stirring, to the sodium hypochlorite solution obtained. The suspension formed is heated to 90° within 1 hour. 160 g. of sodium hydroxide are then added whereupon the reaction mixture begins to reflux. The amine is steam-distilled out of the reaction mixture together with 4 litres of water into a vessel containing 300 ml. of 2 N hydrochloric acid while the water in the reaction mixture is continuously replaced by dropwise addition of water. The insoluble oil present in the hydrochloric acid distillate is removed by extraction with ether. The hydrochloric acid phase is concentrated in vacuo and the base is liberated from the remaining crude hydrochloride analogously to Example 1. The 1-isopentyl-3-cyclohexen-1-ylamine distills at 92–94° and 11 torr. The hydrochloride is produced by addition of aqueous hydrochloric acid to the free base and then evaporating. The hydrochloride is recrystallised from butanone/ether whereupon it melts at 185–187°.

The following compounds are produced analogously: starting from 1-allyl-3-cyclohexene-1-carboxamide, the 1-allyl-3-cyclohexen-1-ylamine, B.P. 66–68°/11 torr, hydrochloride M.P. 201–205° (from butanone/methanol); starting from 1-sec. butyl-3-cyclohexene-1-carboxamide, the 1-sec. butyl-3-cyclohexen-1-ylamine, B.P. 86–87°/11 torr, hydrochloride, M.P. 270–272° with decomposition (from butanone/ether).

EXAMPLE 3

1-methyl-3-cyclohexen-1-ylamine 200 g. of 1-methyl-3-cyclohexene-1-carboxylic acid methyl ester [J. Am. Chem. Soc. 71, 3248 (1949)] and 180 g. of hydrazine hydrate in 135 ml. of ethanol are refluxed for 16 hours. The solvent and excess hydrazine are distilled off under vacuum. The crude hydrazide which remains as an oily residue is dissolved in a mixture of 250 ml. of concentrated hydrochloric acid, 250 ml. of water and 300 ml. of carbon tetrachloride and the solution is cooled to −5°. At −5 to 5°, 51 ml. of a solution of 40 g. of sodium nitrite in 50 ml. of water are added dropwise until potassium iodide-starch paper is colored blue. The mixture is then stirred for 30 minutes at 10–15° and the organic phase is separated.

The solution of crude 1-methyl-3-cyclohexene-1-carbonyl azide obtained as organic phase is refluxed for 2 hours with 180 ml. of water and 100 ml. of concentrated hydrochloric acid, at the end of which time gas development has ceased. The phases are again separated and the aqueous phase is evaporated in a rotary evaporator under vacuum. The remaining, partly crystalline residue is rendered strongly alkaline with concentrated sodium hydroxide solution and extracted twice with 200 ml. of ether each time. The ether is carefully evaporated and the residue which remains is fractionated in vacuum. The fraction which distills at 60–61°/50 torr is 1-methyl-3-cyclohexen-1-ylamine.

The hydrochloride, produced from the base by addition of the calculated amount of aqueous hydrochloride and evaporating, melts, when crystallised from isopropanol, at 246–247° with sublimation.

EXAMPLE 4

2-methyl-3-cyclohexen-1-ylamine 110 g. of 2-methyl-3-cyclohexene-1-carboxylic acid methyl ester (Chem. Abstr. 60, 9162d), dissolved in 300 ml. of ethanol are refluxed for 20 hours with 55 g. of hydrazine hydrate. The reaction mixture is concentrated in a rotary evaporator until it begins to crystallise and then cooled with ice. The crystals are filtered off under suction, well-washed with petroleum ether and dried in vacuo at 60°. In this way, colorless crystals of 2-methyl-3-cyclohexene-1-carboxylic acid hydrazide are obtained which melt at 100–109° (sintered at over 95°).

30 g. of the above hydrazide are suspended in 230 ml. of water, 27 ml. of concentrated hydrochloric acid and 350 ml. of carbon tetrachloride and the mixture is cooled with ice/sodium chloride to 0 to –5°. A solution of 16 g. of sodium nitrite in 65 ml. of water is added at 0–5° while stirring slowly until the reaction mixture colors potassium iodide-starch paper blue. The phases are then separated, the aqueous phase is extracted with 300 ml. of carbon tetrachloride and the extract obtained is combined with the separated organic phase.

The solution of 2-methyl-3-cyclohexene-1-carbonyl azide so obtained is stirred and refluxed with a mixture of 60 ml. of concentrated hydrochloric acid and 190 ml. of water. Gas development ceases after 1 hour. The phases are separated and concentrated separately in vacuo. The residue of the carbon tetrachloride phase, still smelling of isocyanate is again refluxed for 3–4 hours with a mixture of 60 ml. concentrated hydrochloric acid, 190 ml. of water and 400 ml. of xylene. The hydrochloric acid phase thereof is again concentrated. The crystalline residue combined with the first hydrochloric acid residue, is dissolved in about 15 ml. of water and made alkaline with concentrated sodium hydroxide solution. The alkaline solution is extracted three times with 100 ml. of ether each time and the combined ether extracts are dried over solid potassium hydroxide. The ether is then evaporated through a 20 cm. long Vigreux column under about 200 torr. The residue is distilled through a 10 cm. long Vigreux column and yields 2-methyl-3-cyclohexen-1-ylamine as a colorless oil, B.P. 75°/55 torr. This free base is converted with the calculated amount of ethereal hydrochloric acid into its hydrochloride which after crystallisation from isopropanol melts at 160–165° (sinters above 155°).

EXAMPLE 5

1-methyl-3-cyclohexen-yl ammonium salt of (1-methyl-3-cyclohexen-1-ylamino)-methane sulfonic acid 10.3 g. of (1-methyl-3-cyclohexen-1-ylamino)-methane sulfonic acid are suspended in 100 ml. of isopropanol and 5.6 g. of 1-methyl-3-cyclohexen-1-ylamine (cf. Example 3) are added. The solution obtained is filtered and then concentrated in a rotary evaporator under vacuum at 30–40° bath temperature to about 60 ml. On addition of 30 ml. of ether and cooling the salt crystallises. It is filtered off under suction, washed with 10 ml. of a mixture of isopropanol/ether (1:1) and dried. Colorless crystals of the salt given above are obtained, M.P. 123–125°.

(1-methyl-3-cyclohexen-1-ylamino) - methane sulfonic acid required as acid component is produced as follows:

9.4 g. of sodium bisulphite are dissolved in 50 ml. of water, 7.5 g. of a 37% aqueous formaldehyde solution are added at 0–10° and the whole is stirred for half an hour. 10.1 g. of 1-methyl-3-cyclohexen-1-ylamine are then slowly added. A strong exothermic reaction occurs and a solid crystalline precipitate is formed. The temperature of the suspension is adjusted to 0–5° by adding 30 ml. of ice water and exterior cooling. The pH is then adjusted to 1–2 with 6 N hydrochloric acid at a temperature below 10° whereupon the mixture is stirred for another 5–10 minutes. The colorless precipitate is filtered off under suction, washed twice with 20 ml. of ice water and suspended in isopropanol (about 100 ml.). The crystals are again filtered off under suction and washed twice with 50 ml. of ether. After drying at room temperature and 100 torr, colorless crystals of (1-methyl-3-cyclohexen-1-ylamine)-methan sulfonic acid are obtained. These have no clear melting point and are further reacted in the crude state.

EXAMPLE 6

2-methyl-3-cyclohexen-1-yl ammonium salt of (2-methyl-3-cyclohexen-1-ylamino)-methane sulfonic acid 8.8 g. of 2-methyl-3-cyclohexen-1-ylamine are added analogously to Example 5 to 16 g. of crude 2-methyl-3-cyclohexen-1-ylamino)-methane sulfonic acid, produced from the amine of Example 4 analogously to the last paragraph of Example 5, in 150 ml. of isopropanol. The filtered solution is concentrated in vacuo and ether is added. The salt crystallises on cooling. It is filtered off with suction and washed with isopropanol/ether. After drying, the 2-methyl-3-cyclohexen-1-ylammonium salt of (2-methyl-3-cyclohexen-1-ylamino)-methane sulfonic acid melts at 91–95°.

What is claimed is:

1. A compound of the formula

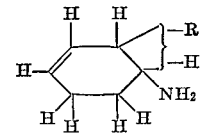

wherein R is a lower alkyl and lower alkenyl.

2. A pharmaceutically acceptable acid addition salt of a compound as defined in claim 1.

3. A compound as defined in claim 1, wherein said compound is 1-methyl-3-cyclohexen-1-ylamine and a pharmaceutically acceptable acid addition salt thereof.

4. A compound as defined in claim 1, wherein said compound is 2-methyl-3-cyclohexen-1-ylamine and a pharmaceutically acceptable acid addition salt thereof.

References Cited

Katgel et al.: "Chem. Abstracts," vol. 48 (1954), p. 3272d.

CHARLES B. PARKER, Primary Examiner

D. R. PHILLIPS, Assistant Examiner

U.S. Cl. X.R.

260—349, 453, 468, 501.1, 501.21, 503, 525, 545, 553, 557; 424—315, 316